United States Patent [19]
Crawford

[11] 3,751,978
[45] Aug. 14, 1973

[54] VEHICLE MOTOR BLOCK TESTER AND METHOD OF USING THE SAME

[76] Inventor: Charles Kenneth Crawford, 503 E. Eight St., Tyler, Tex. 75701

[22] Filed: Sept. 30, 1971

[21] Appl. No.: 185,310

[52] U.S. Cl. ............................................. 73/49.7
[51] Int. Cl. .......................................... G01m 3/06
[58] Field of Search ................... 73/49.7, 119 R, 40

[56] References Cited
UNITED STATES PATENTS

| | | | |
|---|---|---|---|
| 3,608,369 | 9/1971 | Wilkinson | 73/49.7 X |
| R26,657 | 9/1969 | Fitzpatrick et al. | 73/40 |
| 3,326,035 | 6/1967 | Hirota et al. | 73/40 |
| 3,360,984 | 1/1968 | Salsbury et al. | 73/49.7 |

*Primary Examiner*—Jerry W. Myracle
*Attorney*—E. Hastings Ackley

[57] ABSTRACT

Apparatus for supporting a motor block in a position for applying fluid pressure thereto for testing the block for leaks in the water courses defined by the block, by supplying fluid under pressure through an adaptor connected to the water pump opening of the block. The block is mounted on a frame which permits tilting for inspection of the underside of the block. Hydraulic or electric lifts may be utilized for moving the frame. The frame has means for securely clamping the block being tested in place thereon.

A method of testing a motor block for leaks, including the steps of supplying a fluid under pressure into the water course passages of the block. A low viscosity fluid having a coloring material may be used, such as naptha, or ethylene glycol or the like. The fluid is supplied under pressure through the water pump opening of the block and leaks are disclosed by the escape of the fluid through cracks, openings, pin holes, or the like in the block communicating with the water courses therein.

16 Claims, 8 Drawing Figures

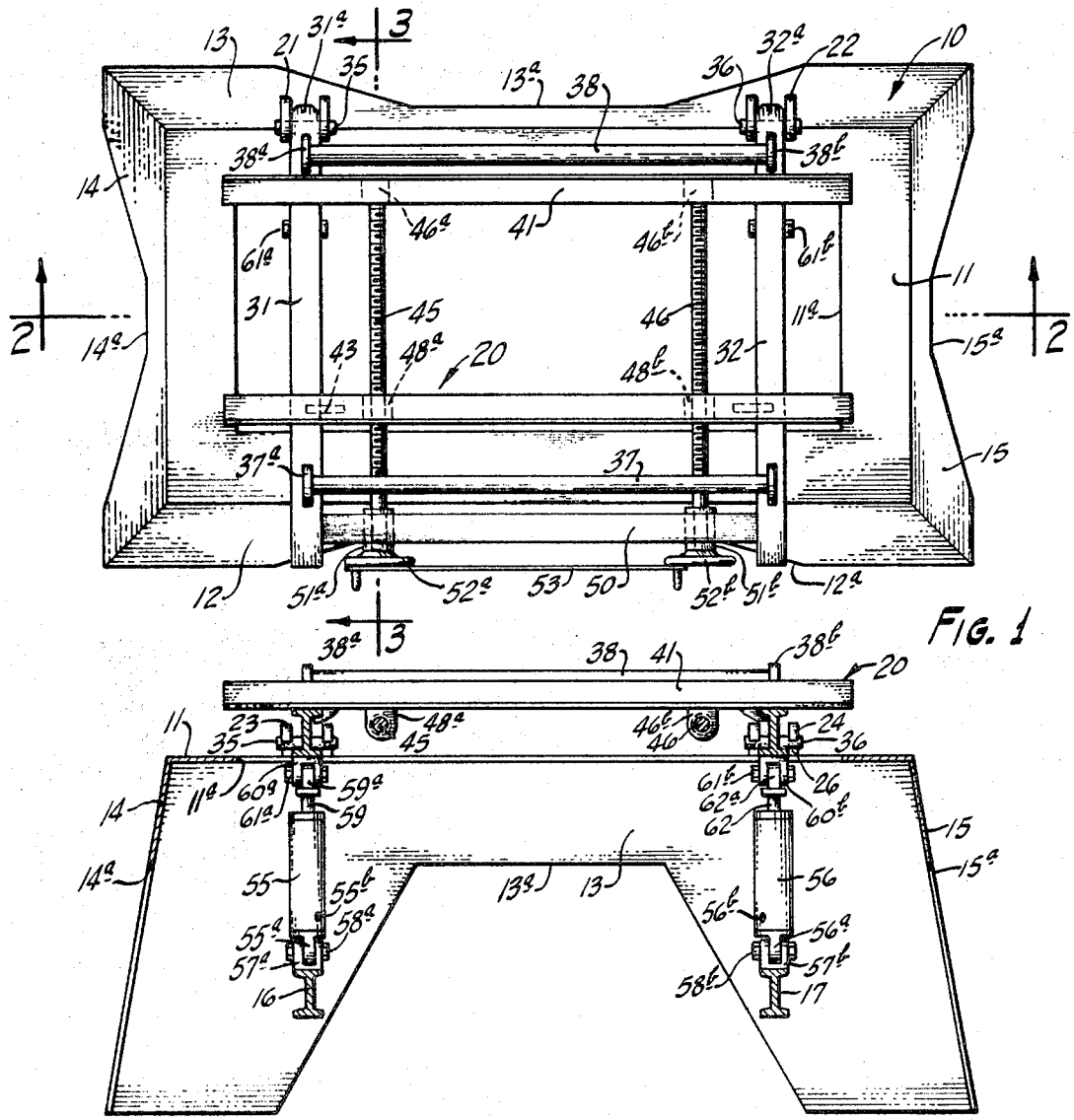
FIG. 1
FIG. 2
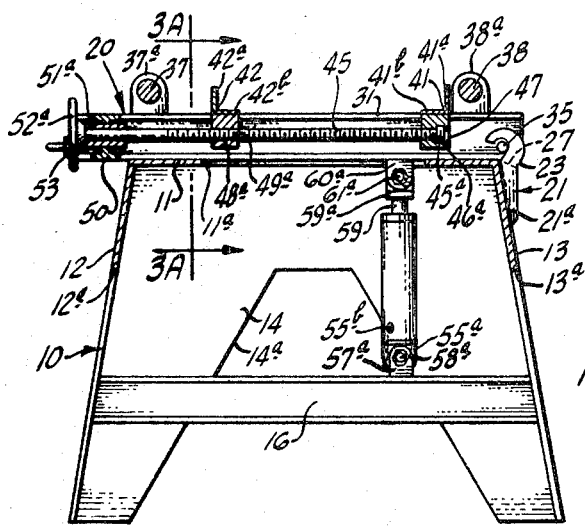
FIG. 3
INVENTOR.
Charles K. Crawford
BY
ATTORNEY

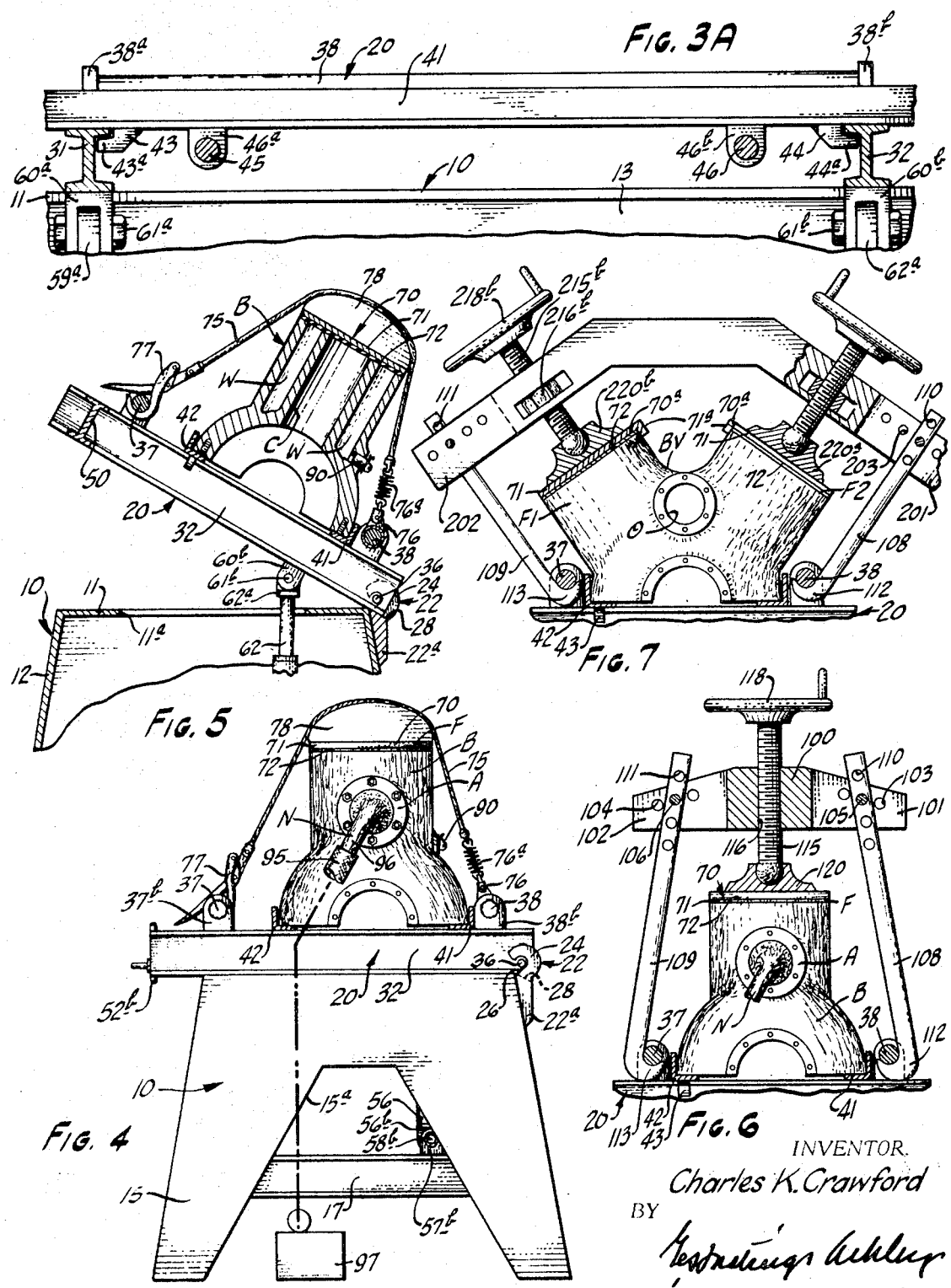

VEHICLE MOTOR BLOCK TESTER AND METHOD OF USING THE SAME

SUBJECT MATTER AND OBJECTS OF THE INVENTION

This invention relates to new and useful improvements in methods and apparatus for testing vehicle motor blocks for leaks from the water course passages of the blocks.

It has been customary in the past to test motor blocks of reconstructed or rebuilt engines for leaks or cracks in the blocks by magnetic flux tests, air pressure tests and similar means. Such means are ineffective in many cases to actually disclose leaks, and are expensive and time consuming. Also, where other means have been employed it has been customary to refinish the blocks before testing. Air under pressure gives no indication of the location of a leak.

It is therefore one object of the invention to provide an improved method and apparatus for testing motor blocks for leaks from the water courses of the block to the oil passages or to the exterior of the block or the cylinder bores.

A particular object of the invention is to provide a method and means for closing off the water course passages of a motor block, supplying a low viscosity light gravity liquid under pressure through an adaptor connected to the pump opening of the block to the water courses of the block, and determining from loss of pressure and the presence of liquids in the oil passages, cylinder bores, or on the exterior of the block, the presence of leaks caused by cracks, pin holes or the like in the metal of the block.

A further object of the invention is to provide an improved apparatus for supporting a motor block in a condition in which the water course passages of the block are sealed by a closure member, and an adapter connected to the pump opening of the block for introducing testing liquid under pressure into the water courses of the block while the block is held in place on the supporting apparatus.

A further object is to provide an apparatus of the character described wherein the support for the block is movable to permit examining the block from above and below as desired.

A further object of the invention is to provide a method of testing a block by applying low viscosity liquid under pressure to the water courses of the block, with the freeze plugs in place therein, for testing the block and freeze plugs for leaks prior to assembling the block into a rebuilt engine.

Still another object of the invention is to provide a method and apparatus of the character described, for testing motor blocks wherein the testing liquid includes a coloring agent to facilitate detection of the escape of the liquid through pin holes, cracks or the like in the block.

A further object of the invention is to provide means for shifting the supporting frame on which the block is supported for testing to permit visual inspection of the lower portion of the block and the lower portion of the cylinder bores and for passages in the block while the same is subjected to the testing liquid under pressure.

Additional objects and advantages of the invention will be readily apparent from the reading of the following description of a device constructed in accordance with the invention, and reference to the accompanying drawings thereof, wherein:

FIG. 1 is a top plan view of a supporting frame and apparatus for supporting a motor block for carrying out the method of the invention;

FIG. 2 is a longitudinal verical sectional view taken on the line 2 — 2 of FIG. 1;

FIG. 3 is a transverse vertical sectional view taken on the line 3 — 3 of FIG. 1;

FIG. 3A is an enlarged fragmentary view, partly in elevation and partly in section, showing the means for slidably retaining the slidable angle supporting member on tiltable frame;

FIG. 4 is an end elevation of the frame of FIG. 1 showing an in-line motor block secured in place on the tiltable frame of the supporting apparatus preparatory for testing;

FIG. 5 is a fragmentary sectional view of the block and seal member of FIG. 4 showing the supporting frame tilted and a section of the motor block with a testing plug in the freeze plug opening of the block;

FIG. 6 is a fragmentary view similar to FIG. 4 showing a modified form of clamp and seal member for use with the supporting apparatus of FIG. 1; and, FIG. 7 is a view similar to FIG. 6 showing a V-type engine block supported on the frame and secured thereto by a modified clamping and sealing device.

In the drawings, the numeral 10 designates generally a base member or pedestal which is shown as being formed with a rectangular upper planar horizontal top or supporting surface 11, having a rectangular central opening 11a therein, a pair of oppositely divergent depending side frame members 12 and 13, and a pair of downwardly divergent end supporting frame members 14 and 15, respectively. The frame members and legs 12, 13, 14 and 15, respectively, are joined at their upper ends to the planar upper rectangular horizontal supporting surface 11 of the pedestal member, and relief or cut-away portions 12a, 13a, 14a and 15a in the mid-portions of such frame members or legs provide for access for cleaning and manipulation of tools under the horizontal supporting surface 11. I-beam braces or cross supports 16 and 17 extend transversely of the base member and are secured at their opposite ends to the side frame members 12 and 13 on either side of the cut-away portions therein, as clearly shown in FIGS. 2 and 3. The several members may be secured together by welding or otherwise in any suitable manner.

A tiltable supporting frame cradle 20 is pivotally mounted on the pedestal or base 10 for a purpose which will be hereinafter more fully explained. A pair of bifurcated hook members 21 and 22 are secured to the upper end of the side frame member 13 at points above the braces 16 and 17, respectively, and spaced inwardly from the ends of the support surface 11, and each hook member has a pair of spaced parallel hook arms 23 and 24, respectively, formed with the openings 25 and 26, respectively, facing toward and extending upwardly and outwardly from the upper planar surface of the top 11 of the base member. The bifurcated hook arms 23 and 24 extend upwardly from the base 21a of the hook members and inclined stop surfaces 27 and 28 are formed at the upper ends of the base sections 21a and 22a, respectively, between the bifurcated hook arms and are adapted to stop tilting movement of the pivoted or tiltable frame or cradle 20, as will be hereinafter more fully explained.

The frame or cradle 20 includes a pair of I-beam cross members 31 and 32 which are spaced longitudinally of the base member 10 and disposed so that the ends 31a and 32a, respectively, of said cross beams enter between the pair of arms 23 and 24 of the bifurcated hook members 21 and 22, respectively, on the base or support, as clearly shown in FIGS. 1 through 3. Transverse pivot pins 35 and 36 are secured to the end of each of the I-beams 31 and 32, respectively, and these pivot pins engage in the hook opening 25 and 26 of the hook arms of each of the bifurcated hook members 23 and 24, respectively, to provide a pivotal connection between the I-beam cross members 31 and 32 and the base or support member 10. A pair of longitudinally extending bars or rods 37 and 38 are secured to upstanding lugs 35a and 37b and 38a and 38b, respectively, secured to the I-beam cross members 31 and 32, respectively. These bars or rods and an I-beam frame tie member or brace 50 connected to the outer free ends of the cross members 31 and 32 hold the frame rigidly in a rectangular configuration and permit the outer ends of the I-beam members to be lifted and lowered in a swinging movement about the pins 35 and 36 engaged in the hook members 21 and 22 of the base.

A longitudinally extending rear angle clamping member 41 is secured, as by welding, to the upper surface of the upper flange of the cross members 31 and 32 and is rigidly held in place thereon with the upstanding flange 41a of the angle member spaced inwardly from the rod or bar 38 and the lugs 38a and 38b and the horizontal flange 41b rigidly secured to the upper surface of the I-beam member or support 31 in a position parallel to the bars or rods 37 and 38 and vertical to the cross members 31 and 32, and with the horizontal flange 41b extending toward the free ends of said cross members. A slidable clamping angle member 42 is also mounted on the upper surface of the cross members 31 and 32 and has its lower horizontal flange 42b extending toward the clamping member 41 and slidably riding on the upper surface of such cross members. The upstanding flange 42a of the angle member 42 is spaced outwardly from the flange 42b so that the flange 42b coacts with the flange 41b of the angle member 41 to provide a support for motor blocks, as will hereinafter be more fully explained.

A pair of opposed outwardly extending retaining hooks and slides 43 and 44 are secured at longitudinally spaced points to the underside of the slidable angle member 42 and have outwardly extending hooks or retaining members 43a and 44a, respectively, engaged below the projecting flanges of the cross members 31 and 32, respectively, to retain the angle member 42 in slidable position on the upper surface of the upper flanges of the I-beam cross members, as shown in FIG. 3A. The hook members 43a and 44a may engage under either the upper flange or the lower flange of the cross members, as desired. Since the retaining members 43 and 44 closely engage the inner edges of the flanges of the cross members 31 and 32, the angle member 42 is held against longitudinal movement on the cross members and is slidable transversely of the frame along the cross members.

Each of the angle members 41 and 42 has depending lugs thereon for receiving and supporting cross-feed operating screws 45 and 46 for causing adjustable sliding movement of the angle member 42 on the cross members 31 and 32. The depending lugs 46a and 46b on the rear or fixed angle clamping member 41 are provided with openings 47a and 47b which receive the heads 45a and 46a of the cross-feed screws 45 and 46, respectively, whereby the cross-feed screws may rotate in the lugs 46a and 47a about the longitudinal axes of said cross-feed screws. Depending lugs 48a and 48b are provided on the underside of the flange 42b of the movable angle clamping member 42 and have threaded bores 49a and 49b, respectively, in which the threaded cross-feed screws 45 and 46 are engaged for rotary movement to cause sliding movement of the angle clamping member on the cross support members 31 and 32. Rotation of the cross-feed screws 45 and 46 about their longitudinal axes will cause movement of the lugs 48a and 48b and the angle member 42 longitudinally relative to the support members 31 and 32.

A pair of bushings 51a and 51b are welded or otherwise secured in apertures in the brace or tie member 50, and the ends of the cross-feed screws 45 and 46 extend outwardly through the bushings. Each of the cross-feed screws 45 and 46 has a hand wheel 52a and 52b, respectively, secured theereto for rotating the cross-feed screw to cause movement of the angle support 42. If desired, the hand wheels 52a and 52b may be tied together by a link 53, or otherwise, as by chain and sprockets on the cross-feed screws 45 and 46, to cause simultaneous movement of the hand wheels and the cross-feed screws to produce uniform movement of the angle support 42 toward and away from the angle member 41.

The motor block, as will be hereinafter more fully described, is supported on the inward facing horizontal flanges 41b and 42b of the angle members 41 and 42, respectively, and the upstanding flanges 41a and 42a of said angle members are moved into clamping or gripping engagement with the outer lateral lower portions of the block to securely clamp the lower portion of the block on the angle members.

In use of the apparatus, the cradle 20 may be swung about the pivot pins 35 and 36 in any suitable manner. However, as shown in FIGS. 2 and 3, hydraulic cylinder operating means 55 and 56 are connected between the cross brace 16 and the I-beam cross support member 31, and between the cross brace 17 and the I-beam cross support member 32, respectively. The cylinder 55 and the cylinder 56 are pivotally connected to the I-beam cross brace members 16 and 17 by projecting ribs 55a and 56a at the lower ends of the cylinders having pins 58a and 58b engaged in bifurcated supported flange 57a and 57b, respectively, whereby the cylinders 55 and 56 may pivot about the pins. The bifurcated supports 57a and 57b are welded or otherwise secured in place on the upper surfaces of the cross braces 16 and 17. The piston rod 59 of the cylinder 55 has a head 59a which is engaged in a downwardly facing connecting lug 60a welded or otherwise secured to the underside of the I-beam cross support member 31 and a pin 61a provides for pivotal movement between the piston shaft 59 and the connecting lug 60a as the piston in the cylinder 55 extends and retracts the rod 59. Extension of the rod 59 from the cylinder will cause the I-beam cross support member 31 to be lifted to swing about the pin 35 to tilt the frame or cradle to the position shown in FIG. 5.

Similarly, the hydraulic cylinder 56 has the projecting rib 56b at its lower end pivotally secured by the pivot pin 58b to the supporting lug 57b which is welded or otherwise secured to the upper surface of the cross brace 17 of the base member, and the rod or shaft 62 of the piston of the hydraulic cylinder extends outwardly therefrom and has a head 62a which is pivotally connected by a pin 61b to a downwardly extending bifurcated connecting lug 60b welded or otherwise secured to the underside of the lower flange of the I-beam cross support member 32. Thus, when the shaft 62 of the hydraulic cylinder 56 is extended, the I-beam cross member 32 is swung upwardly about the pin 36 in the hook member 22 on the base member 10, in the same manner as the opposite hydraulic cylinder 55 swings the cross member 31. This causes uniform tilting or swinging pivotal movement of the frame or cradle 20 about the pins 35 and 36.

Suitable hydraulic fluid connections 55b and 56b are provided on the hydraulic cylinders 55 and 56, respectively, for connecting to the cylinders hydraulic fluid operating fluid conducting lines in the usual manner for supplying hydraulic fluid to the cylinders to control movement of the pistons and the shafts therein.

In use of the device, the motor block B is placed on the inwardly extending flanges 41b and 42b of the angle members 41 and 42, respectively, and the lead screws 45 and 46 are rotated by the handles 52a and 52b to move the movable angle member 42 toward the fixed angle member 41 to clamp the sides of the base of the block secure between the upstanding flanges 41a and 42a of the angle clamping members. With the flanges so gripping the base of the block, a clamping closure and seal block 70 having a flat metallic body section 71 and a resilient oil and water resistant seal 72 on its lower face is clamped to the upper or head face F of the block B. The closure and seal member 70 is securely held in place on the head face of the block by suitable clamping means, shown in FIG. 4 to be a cable 75 having a hook 76 at the rear end and an over-center locking member 77 at the outer or front end. The hook 76 engages over the rear rod 38 between the ends thereof while the locking member 77 engages over the front rod or bar 37 between the ends thereof, and a cable 75 extends upwardly over an upstanding or projecting rib 78 which may have a groove in its upper surface in which the cable is adapted to fit. The rib 78 is preferably curved to assure the application of uniform pressure to the plate 71 and seal member 72 which engages the face F of the motor block to seal therethrough, and so close the same against fluid seepage from the water courses W which normally open through the head face of the block and into the head (not shown). It is preferable that two or more of the ribs and clamping means be used for securely holding the closure and seal members in place. These ribs and clamping means would preferably be spaced uniformly along the length of the closure and seal member to assure proper closure and sealing of the water courses of the block. The seal member 72 seals off the cylinder bore C and the oil courses (not shown) isn the motor block from the water courses W in said block. Suitable freeze plug closure members 90 of the expansible seal type may be inserted in the freeze plug openings of the block and clamped in place therein to close the freeze plug openings. If desired, of course, the regular freeze plugs may be inserted in the block prior to testing.

When the block is clamped in place on the supporting frame or cradle, a water pump opening adapter A is bolted in the same manner as a water pump to the water pump opening O of the motor block, and a hose 95 is secured to the neck end 96 of the adapter and extends to a source of testing fluid pressure and supply, which may be a recirculating pump and tank 97 disposed beneath the base member 10 or alongside one end thereof. With the adapter A bolted in place with a gasket for sealing between the adapter and the block, testing fluid under pressure is applied through the adapter to the water courses in the block and is elevated to a pressure of from 10 to 100 pounds per square inch. The fluid may be naptha or ethylene glycol or other suitable low viscosity light gravity liquid which will readily penetrate through cracks, openings, fissures or pin holes in the block under the pressures mentioned. By applying color to the fluid, any leaks which are present in the block will be readily detected visually by the escape of the color fluid into the oil courses, or the cylinder walls, or exteriorly of the block, or past the freeze plug opening closures.

It is preferable that the testing fluid be heated somewhat so that the block will be expanded as it becomes heated, and any fissures, cracks or pin holes therein will be more readily detected as the fluid passes outwardly therethrough from the water courses. Using a light gravity, low viscosity fluid such as naptha, or other light-end petroleum products, or ethylene glycol, it will be assured that the leaks will be readily detected, particularly when coloring matter is added to the testing fluid. Obviously, if desired, pneumatic testing may be performed by supplying air under pressure through the water pump adapter to the water courses of the block and immersing the block in water or coating it with a surfactant treated detergent fluid on the exterior thereof to produce bubbles upon the escape of air. It is preferable, however, that the liquid type testing fluid be used. Naptha or the like will readily evaporate, and will not affect the block after the testing has been completed.

While the water courses of the block are filled with testing fluid under pressure, the cradle or frame 20 may be tilted by extending the rods of the hydraulic cylinders 55 and 56 to lift the swingable side of the frame, pivoting the same about the pins 35 and 36 extending through the bifurcated hook members 21 and 22. Since the hooks extend over and downwardly beyond the upper arcuate surfaces of the pins, the frame will be positively held in place on the base member 10 and the stop shoulders 27 and 28 will positively limit upward swinging movement of the frame or cradle, as will be the limited movement of the cylinder in the hydraulic piston 55. It is preferable that the swinging movement of the frame or cradle be stopped prior to full extension of the rods from the cylinders, and prior to engagement of the rod with the rear edge of the opening 11a in the upper surface 11 of the base 10.

A modified form of clamping device is shown in FIG. 6 wherein a frame 100 having laterally projecting bifurcated arms 101 and 102 on the opposite sides thereof has a plurality of transverse openings 103 and 104 in such arms for receiving pins 105 and 106, respectively, which support and pivotally secure clamping hook arms 108 and 109 to the bifurcated arms of the frame. The hook arms have a plurality of openings 110 and 111 in one end by means of which they may be adjustably connected to the bifurcated arms of the frame, and likewise have hooks 112 and 113 at the opposite depending end which are disposed to engage beneath the rods 37 and 38 of the tiltable frame to permit the adjusting locking screw 115 to be move downwardly through a threaded nut or bushing 116 carried in the central portion of the clamp frame 100 to move a pivoted pressure foot plate 120 on the lower end of the locking screw downwardly against the seal closure and seal member 70 which includes the flat closure plate 71 and the seal 72. A hand wheel 118 may be used to rotate the locking screw 115 to adjust the position of the pressure foot 120 to cause the closure and seal member to be moved into tight sealing engagement with the head face F of the block B. A pair or more of these clamps may be used with the usual in-line motor block B for clamping the closure and sealing plate in position on the head face of the block.

A further modification of the device is shown in FIG. 7, wherein a V-type engine block BV is secured at its base between the angles 41 and 42, in the same manner as the in-line block was secured, and a clamping member 200 having bifurcated arms 201 and 202 at its ends is used to support the hooks 108 and 109 for engagement with the clamping rod 37 and 38 in the same manner as the clamp of FIG. 6. This clamp has an angular shape, which may also be arcuate if desired, with the arms 201 and 202 disposed at an angle corresponding substantially to the angle of the head faces F1 and F2 of the V-type engine block. Two closure and seal members 70 are held against the faces F1 and F2, one on each of the faces, by adjustable clamping screws 215a and 215b, respectively, which are adjusted longitudinally by means of hand wheels 218a and 218b, respectively, to force the pivotal pressure feet 220a and 220b into engagement with the closure and sealing members 70 for closing the water courses opening through the faces F1 and the face F2 of the block. A water pump opening adapter connection A is affixed, in the same manner as has been already explained and as shown in FIG. 4, to the water pump opening O of the block and testing fluid under pressure is fed therethrough into the water courses of the block in the same manner as has been described to determine the presence of the leaks resulting from pin holes, fractures, cracks or fissures in the block communicating with the oil passages of the block or the cylinder bores, or with the exterior of the block or the like. Also, freeze plugs may be inserted prior to testing for determining that the plugs are properly secured in place in the block prior to assembly of the refinished block into a rebuilt engine.

It is believed manifest that other means may be utilized for clamping the closure and seal members 70 securely on the head face F of the various motor blocks to close the water courses opening therethrough for the purpose of testing. Also, it is believed readily apparent that any suitable fluid may be utilized for carrying out the test, and that the base and cradle are readily adapted to fit engines or engine blocks of various sizes and lengths to securely clamp the same in place thereon for testing. It is also believed readily apparent that the cradle or frame 20 may be tilted to swing the blocks up for inspection of the underside thereof during testing.

While the frame has been illustrated and described as being operated hydraulically, it is apparent that pneumatic pressure may be used to operate the cylinders 55 and 56 or that an electric motor driven jacking arrangement may be interposed between the cross bases 16 and 17 and the cross members 31 and 32, respectively, for swinging or pivoting the frame or cradle about the pins 35 and 36 on the base.

It will particularly be noted that the liquid testing fluid, which is preferably a low gravity, low viscosity hydrocarbon liquid, may be heated and forced into the water courses of the engine under elevated pressures to assure that the same will penetrate through any apertures, pin holes or fissures in the block and readily bring the same to the attention of the operator. By mixing color with the testing fluid the presence of the fluid at a leak is more readily determined or ascertained.

This apparatus and method permits testing the blocks prior to assembly of the same into rebuilt engines so that defective blocks may be discarded before assembly of the engine is completed, thus effecting a saving in the manufacture of reconditioned, rebuilt engines. It is also readily apparent that a single operator may test blocks quickly and efficiently by use of the apparatus and the method which has been disclosed, and that the testing fluid may be used repeatedly, being drained from the block after completion of the test back into the pressure system from which it was delivered under pressure through the water pump adapter fitting through the block. Heads may also be tested by closing and sealing the lower face and circulating through the radiator hose connection, if desired.

The foregoing description of the invention is explanatory only, and changes in the details of the constructions illustrated may be made by those skilled in the art, within the scope of the appended claims, without departing from the spirit of the invention.

What is claimed and desired to be secured by Letters Patent is:

1. Apparatus for testing motor blocks to detect the presence of cracks, fissures, pin holes, and the like communicating the water courses of the block, oil passages and cylinder bores therein, said apparatus including: a supporting base; a clamping frame swingably carried by said base; first clamping means on said clamping frame for engaging and clamping the sides of the base of a motor block to hold the same against lateral or longitudinal movement on the frame; a closure and seal member having seal means thereon engageable with the head face of the block for closing the water courses opening therethrough; second clamping means adjustably connected with said swingable clamping frame engageable with said closure and seal member for clamping the closure and seal member securely against head face of the block and for clamping the block in place in engagement with said first clamping means on the frame against vertical or tilting movement thereon or out of engagement with said first clamping means; water pump adapter means for connection to the water pump opening of the block for conducting testing fluid into the water courses of the block; means connected with said adapter means for delivering testing fluid under pressure to the block through the adapter means and including means movable with said adapter when said clamping frame is swung on said base; and means for moving the clamping frame with respect to the base with the motor block secured on said clamping frame and moving therewith with testing fluid under pressure delivered into said block to expose the lower portion of the block for inspection for leaks.

2. A testing apparatus of the character set forth in claim 1 wherein the first clamping means for clamping the base of the block on the movable frame comprises a pair of parallel support members having horizontal opposed inwardly extending supporting members and upwardly extending clamping members projecting from the supporting members; means for moving one of said support members in parallel relationship toward and away from the other to clamp a motor block base between said upwardly extending clamping members of said support members.

3. Testing apparatus of the character set forth in claim 1, wherein the movable supporting frame is pivotally connected to the base along one edge of the frame and at one side of the base whereby the frame is swingable above the base along an axis overlying the longitudinal edge of the base and the movable frame.

4. Apparatus of the character set forth in claim 1 wherein said means for moving said clamping frame with respect to said base includes: means pivotally connecting said clamping frame along one longitudinal edge thereof to the base; and means for swinging said clamping frame about said pivotal connection to tilt the frame and a block carried thereby above the frame for inspection of the lower portion of the block during testing.

5. Apparatus of the character set forth in claim 4 wherein the means for swinging the supporting frame comprises: fluid operated cylinders connected between the base and the movable clamping frame.

6. Apparatus of the character set forth in claim 1 wherein the closure and seal means comprises a flat imperforate rigid plate having a sealing member on one surface thereof disposed to engage the head face of a block to be tested for sealing the water courses opening through said face of said block; and means engageable by said second clamping means for clamping said closure and seal means in closing and sealing engagement with the face of the block.

7. Apparatus of the character set forth in claim 1 wherein the second clamping means for clamping the closure and seal means in place on the head face of the block for closing the water courses opening therethrough comprises: a flexible member secured at one end to the movable clamping frame and having means at its other end for adjustably securing said end to the clamping frame and for adjustably tightening the flexible member to hold the closure and seal means securely in place.

8. Apparatus of the character set forth in claim 1 wherein the second clamping means for clamping the closure and seal means on the head face of the block being tested comprises: a pair of laterally spaced parallel bars secured on the swingable clamping frame; and a rigid clamp member having pair of hook means engageable with the bars and having clamping screw means between said hook means movable toward and away from the face of the block for clamping the closure and seal means in closing sealing engagement with the face of the block.

9. A method of testing a motor block for detecting cracks, pin holes, fissures or the like communicating the water courses of the block with the oil passages and cylinder bores, and with the exterior thereof which comprises: connecting a source of testing fluid under pressure to the water pump opening of the block; heating the testing fluid to an elevated temperature, closing the water course openings through the head face of the block; forcing heated testing fluid under elevated pressure into the water courses through the water pump opening; indicating by escape of testing fluid into the oil passages and cylinder bores of the block the presence of leaks between the water courses and the oil passages, cylinder bores, crank case wall of the exterior of the block; and moving the block about its longitudinal axis to expose the base of the block for inspection to determine the presence of leaks indicated by the escaped testing fluid, if any.

10. The method of claim 9 wherein the testing fluid comprises a low viscosity, light gravity liquid.

11. The method of claim 9 wherein the testing fluid comprises naptha.

12. The method of claim 9 wherein the testing fluid comprises ethylene glycol.

13. The method of claim 9 wherein the testing fluid comprises a low viscosity, light gravity hydrocarbon liquid.

14. The method of claim 9 including the step of withdrawing the testing fluid from the water courses of the block after completing the pressure test.

15. The method of claim 9 including treating the testing fluid with a coloring material for facilitating observation of the escape of such fluid from the water courses of the block being tested to the oil passages, cylinder bores, crank case wall or exterior of the block.

16. The method of claim 9 including the step of closing the freeze plug openings of the block by freeze plugs prior to forcing the testing fluid into the water courses of the block, whereby the seal of the freeze plugs with the block may be tested simultaneously with the test for other leaks.

* * * * *